United States Patent
Zhu et al.

(10) Patent No.: US 8,311,545 B2
(45) Date of Patent: Nov. 13, 2012

(54) MACRO-TO-FEMTO CELL RESELECTION

(75) Inventors: Jing Zhu, Portland, OR (US);
Xiangying Yang, Portland, OR (US);
Shilpa Talwar, Santa Clara, CA (US);
Muthaiah Venkatachalam, Beaverton, CA (US)

(73) Assignee: Intel Corporation, Santa Clara, CA (US)

(*) Notice: Subject to any disclaimer, the term of this patent is extended or adjusted under 35 U.S.C. 154(b) by 399 days.

(21) Appl. No.: 12/456,987

(22) Filed: Jun. 24, 2009

(65) Prior Publication Data

US 2010/0331000 A1    Dec. 30, 2010

(51) Int. Cl.
*H04W 36/00* (2009.01)
*H04W 36/34* (2009.01)

(52) U.S. Cl. ......... 455/444; 455/436; 455/450; 370/331
(58) Field of Classification Search ....... 455/432.1–444; 370/331–338
See application file for complete search history.

(56) References Cited

U.S. PATENT DOCUMENTS

| | | |
|---|---|---|
| 7,464,212 B2 | 12/2008 | Narad |
| 2004/0121770 A1* | 6/2004 | Tigerstedt et al. ............ 455/436 |
| 2004/0260786 A1 | 12/2004 | Barile |
| 2006/0142004 A1* | 6/2006 | He et al. ......................... 455/434 |
| 2008/0076423 A1* | 3/2008 | Lee et al. ....................... 455/436 |
| 2008/0147439 A1 | 6/2008 | Maliszewski |
| 2009/0088152 A1* | 4/2009 | Orlassino .................... 455/432.1 |
| 2009/0093252 A1* | 4/2009 | Czaja et al. .................... 455/436 |
| 2009/0312019 A1* | 12/2009 | Chen et al. .................. 455/435.2 |
| 2010/0022250 A1* | 1/2010 | Petrovic et al. ............... 455/450 |
| 2010/0278141 A1* | 11/2010 | Choi-Grogan et al. ........ 370/331 |

FOREIGN PATENT DOCUMENTS

| | | |
|---|---|---|
| EP | 1903827 A2 | 3/2008 |
| WO | 2008/153847 A1 | 12/2008 |
| WO | 2011/005416 A2 | 1/2011 |

OTHER PUBLICATIONS

International Search Report and Written Opinion for PCT Application No. PCT/US2010/038465, mailed on Feb. 1, 2011, 9 pages.
International Preliminary Report on Patentability Received for PCT Patent Application No. PCT/US2010/038465, Mailed on Jan. 12, 2012, 5 pages.

* cited by examiner

*Primary Examiner* — Anthony Addy
*Assistant Examiner* — Kashif Siddiqui
(74) *Attorney, Agent, or Firm* — Cool Patent, P.C.; Kenneth J. Cool; Joseph P. Curtin

(57) ABSTRACT

The present invention discloses a method including: storing identification information or location information for a handover previously performed by a mobile system; estimating when the mobile system enters within a coverage area of a target femtocell; recognizing the coverage area based on the identification information or the location information; and scanning for the target femtocell prior to handover.

9 Claims, 5 Drawing Sheets

Table 1: MOB_FHO-REQ Management Message

| Syntax | Size (bit) | Notes |
|---|---|---|
| MOB_FHO-REQ_Message_Format() | | |
| { | | |
| Management Message Type = 200 | 8 | |
| N_FBSs | 3 | number of requested femto BSs |
| Reserved | 5 | |
| For (j=0; j < N_FBSs; j++) { | | |
| Base Station ID | 48 | |
| } | | |
| TLV encoded information | variable | |
| } | | |

FIG. 5

Table 3: MS's local FBS Database

| | Bytes | Notes |
|---|---|---|
| Base Station ID | 6 | same as the "BS Station ID" field in the DCD message |
| Location | 8 | Byte 0-2: integer (Latitude x $(2^{24} - 1) / 360$)<br>Byte 3-5: integer (Longitude x $(2^{24} - 1) / 360$)<br>Byte 6-7: range (meter) |
| PHY mode ID | 2 | same as the "PHY mode ID" fields in the MOB_NBR-ADV message |
| Preamble Index | 1 | each value uniquely identifying a preamble |
| Center Frequency (= $F_i$ + n x 250KHz) | 2 | Bits 0-10 (n): the number of steps (each step is 250KHz)<br>Bits 11-15 (i): each value uniquely identifying the start frequency for a specific band |
| Frame Start Offset | 1 | number of symbols between the frame starting time of MBS and FBS |

FIG. 7

Table 2: MOB_FHO-RSP Management Message

| Syntax | Size (bit) | Notes |
|---|---|---|
| MOB_FHO-RSP_Message_Format() { | | |
| Management Message Type = 201 | 8 | |
| FBS Indicator Bitmap | 8 | Each bit corresponds to a requested FBS in the MOB_FHO-REQ message<br>• 0: information of a particular femto BS is not available<br>• 1: information of a particular femto BS is available |
| For (j=0; j < n; j++) { | | n indicates the number of the femto BSs whose information is available at the serving macro BS |
| Information Indicator Bitmap | 8 | Bit 0: PHY mode ID indicator<br>Bit 1: Preamble index indicator<br>Bit 2: Center Frequency indicator<br>Bit 3: Location indicator<br>Bit 4: DCD-UCD indicator<br>Bit 5: Frame Start Offset indicator<br>Bit 6 - 7: reserved |
| If (PHY mode ID indicator == 1){<br>PHY mode ID<br>} | 16 | same as the "PHY mode ID" fields in the MOB_NBR-ADV message |
| If (Preamble Index indicator == 1)<br>{<br>Preamble Index<br>} | 8 | each value uniquely identifying a preamble |
| If (Center Frequency indicator == 1) { Center Frequency<br>(= $F_i$ + n x 250KHz)<br>} | 16 | Bits 0-10 (n): the number of steps (each step is 250KHz)<br>Bits 11-15 (i): each value uniquely identifying the start frequency for a specific band |
| If (Location indicator == 1) {<br>Location<br>} | 64 | Byte 0-2: integer (Latitude x ($2^{24}$ - 1)/360)<br>Byte 3-5: integer (Longitude x ($2^{24}$ - 1)/360)<br>Byte 6-7: range (meter) |
| If (DCD-UCD indicator == 1{<br>DCD setting | variable | |
| UCD setting | variable | |
| } | | |
| If (Frame Start Offset indicator == 1) {<br>Frame Start Offset<br>} | 8 | number of symbols between the frame starting time of MBS and FBS |
| TLV encoded information | variable | |
| } | | |

FIG. 6

MACRO-TO-FEMTO CELL RESELECTION

BACKGROUND OF THE INVENTION

1. Field of the Invention

The present invention relates to a field of wireless communication and, more specifically, to an apparatus for and method of reselection from macrocell to femtocell.

2. Discussion of Related Art

Mobile wireless systems allow users to communicate using wireless transceivers. The mobile wireless systems include cellular telephone systems and Personal Communication Services (PCS) telephone systems. The wireless transceivers include cellular telephones, PCS telephones, personal digital assistants (PDAs), and Mobile Internet Devices (MIDs).

The mobile wireless systems are licensed by the government to access and use certain signal frequencies. Base stations are installed about a mile apart to support communication on the licensed frequencies. The base stations include cellular towers in a cellular network. Limitations in voice and data-transfer quality, rates, and range, however may result in a quality of service (QoS) of the licensed wireless systems to become lower than for conventional wired (landline) systems that constrain mobility of the users.

A femtocell is a low-power wireless access point that operates in licensed spectrum to connect standard mobile devices to a mobile operator's network using a broadband connection, such as a Digital Subscriber Line (DSL) or a cable modem. The femtocell allows a service provider to extend its service coverage indoors, especially where access would otherwise be limited or unavailable.

Handover from a macrocell to a femtocell currently requires the macrocell base station to periodically broadcast system information of all neighboring base stations in order to notify all mobile systems within range. A neighbor list of cells includes potential handover candidates for selection and redirection before the handover.

Such a protocol is, however not scaleable when a large number of femtocells is co-located with the macrocell. In particular, the current protocol may consume excessive battery power and incur unnecessary service interruptions.

Thus, a new solution is required to provide for an efficient handover when the use of femtocells is widespread.

BRIEF DESCRIPTION OF THE DRAWINGS

FIG. 5 shows Table 1: MOB_FHO-REQ Management Message according to an embodiment of the present invention.

FIG. 6 shows Table 2: MOB_FHO-RSP Management Message according to an embodiment of the present invention.

FIG. 7 shows Table 3: mobile system's local FBS Database according to an embodiment of the present invention.

DETAILED DESCRIPTION OF THE PRESENT INVENTION

Figure 1:
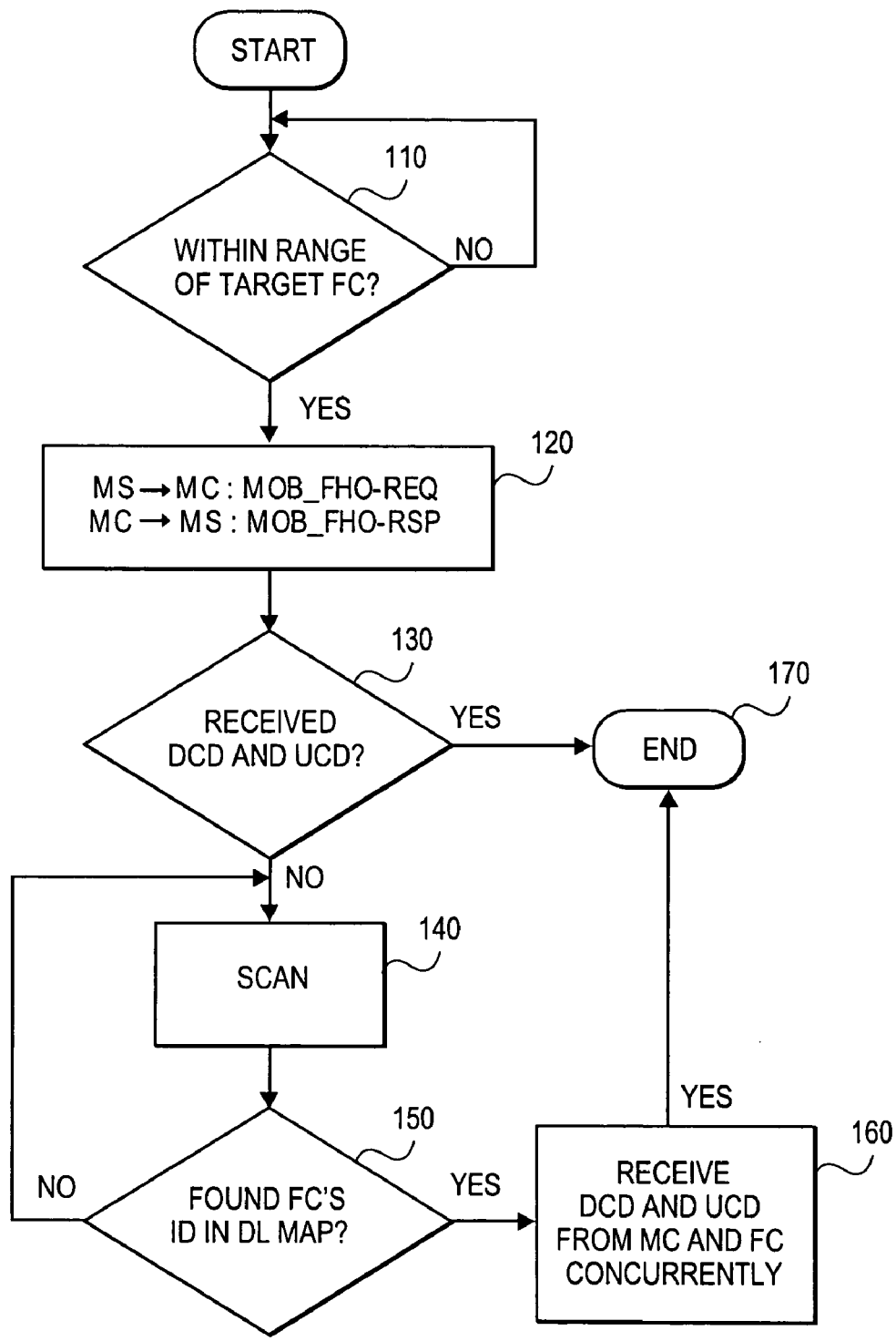
FIG. 1 shows a flowchart for cell reselection according to an embodiment of the present invention.

In the following description of the invention, numerous details, examples, and embodiments of the invention are set forth to provide a thorough understanding of the present invention. It will, however become clear and apparent to one of ordinary skill in the art that the invention is not limited to the details, examples, and embodiments set forth and that the invention may be practiced without some of the particular details, examples, and embodiments that are described.

In other instances, one of ordinary skill in the art will further realize that certain details, examples, and embodiments that may be well known have not been specifically described so as to avoid obscuring the present invention.

Although various embodiments of the present invention may be described in relation to broadband wireless metropolitan area networks (WMANs), the invention may also be applied to other types of wireless networks. Such networks may include wireless local area networks (WLANs), wireless personal area networks (WPANs), and wireless wide area networks (WWANs) such as cellular networks.

Furthermore, while specific embodiments may be described in reference to Worldwide Interoperability for Microwave Access (WiMAX), the embodiments of the present invention are not limited thereto and may be implemented using other air interfaces including single carrier communication channels where suitably applicable.

The following embodiments may be used in various applications including transmitters and receivers of a radio system. The present invention is, however not limited in this respect. Radio systems within the scope of the present invention include, but are not limited to, network interface cards (NICs), network adaptors, fixed or mobile client devices, mesh relays, base stations, gateways, bridges, hubs, routers, and other network peripherals.

Furthermore, the radio systems within the scope of the invention may be implemented in cellular radio telephone systems, satellite systems, personal communication systems (PCS), two-way radio systems, and two-way pagers as well as computing devices, including radio systems, such as personal computers (PCs), personal digital assistants (PDAs), mobile internet devices (MIDs), hand-held communication devices, and all systems which may be related in nature and to which the principles of the embodiments may be suitably applied.

A femtocell is a device that combines a cellular base station (BS) and an access point (AP). The femtocell may be small, light, self-contained, and inexpensive. In many applications, the femtocell includes security that is reliable and functionality that is plug-and-play.

The plug-and-play femtocell may be readily installed by a user rather than an operator of a network. The femtocell may perform one or more functions, including auto-configuration, self-discovery (of the operator's network), self-authentication, self-registration, self-optimization, and automatic upgrading.

In some applications, the femtocell may further perform auto-provisioning which may involve preparing and equipping the network to provide a new service to its users.

In a typical application, the femtocell may be deployed indoors, such as in a small office or home office (SOHO), to extend and improve coverage to hard-to-reach dead spots at a far edge of the network that result from a particular location or construction of a building. During operation, the femtocell may provide a radio frequency (RF) signal with a transmit power of 10-300 m.

If desired, the femtocell may provide simultaneous access for an open group of users. Alternatively, the simultaneous access may be restricted to a closed group of users. In a particular deployment, the group may include 1-60 concurrent users.

Besides extending and improving indoor coverage, the femtocell may increase capacity of the network for bandwidth-intensive mobile services, such as Internet browsing and video calling. As an example, a peak data transfer rate at 8.75 MHz may include 20-40 Mbps downlink (DL) and 5-10 Mbps uplink (UL).

Furthermore, the femtocell avoids burdening the cellular network and thus reduces congestion by routing Internet Protocol (IP)-based services directly back to the mobile carrier's fixed infrastructure. For example, the femtocell may use an existing wired connection for broadband, such as Asymmetric Digital Subscriber Line (ADSL), cable, Ethernet, or Optical Fiber, for IP backhaul to the operator's core network.

During a connection for voice, video, or data within the coverage radius, the femtocell may mediate a local connection to a macrocell in the external or outdoor cellular network. The macrocell usually includes a base station (BS) outside the building where the femtocell is located. Both the femtocell and the macrocell may operate in spectrum already licensed by the operator.

The femtocell and the macrocell may share frequencies or use different frequencies. When the macrocell and the femtocell operate in the same frequency, the air interface should support synchronization with low complexity.

In a particular deployment, 1-1,500 femtocells may be located within the coverage area of the macrocell. Preferably, neighboring femtocells should not interfere with each other. The femtocells should also co-exist with other connection technology that is available, including WiFi and Bluetooth, both of which use unlicensed spectrum.

In some cases, the user includes a stationary device, such as a notebook (laptop) computer or a sub-notebook (netbook) computer. More typically, the user includes a mobile system (MS), such as a cellphone, a personal digital assistant (PDA), or a mobile internet device (MID). The user is often moving slowly within a building, such as at a typical walking speed of about 3-4 miles per hour.

Even as the user moves while the mobile system is sending and receiving signals, it may be necessary to determine when and where to optimally initiate cell reselection prior to handoff or handover (HO). Delaying handover may initially maintain a higher utilization of cell capacity, but may subsequently risk degrading signal level and quality.

The handover from macrocell to femtocell, from femtocell to another femtocell, and from femtocell to macrocell should be efficient, reliable, and seamless to maintain a high Quality of Service (QoS). It may be more efficient for the femtocell to use a hard handover in which the signal for the mobile system is transferred completely from an femtocell to another femtocell.

Risk of a bad handover may, however be reduced when the femtocell uses a soft handover in which the mobile system is temporarily connected to two or more femtocells. In such a situation, the level and quality of the signal from the various femtocells are compared with each other so that the femtocell with better security, stronger signal level, and higher quality may ultimately be selected.

Cell reselection is a process that generally precedes handover. Cell reselection involves the mobile system scanning and associating with one or more base stations to determine suitability of each base station as a handover target. Any existing connection to a serving base station may be maintained during cell reselection.

The present invention includes an estimation of when the mobile system most likely enters within a coverage area of a target femtocell. Some embodiments of the present invention may utilize location-based information together with stored system information to perform a hand-over to a target femtocell.

Advantageously, the use of the location-based information together with stored system information to perform a hand-over in accordance with some embodiments of the invention may save energy in the mobile system and may reduce bandwidth requirements for the cellular system. As shown in FIG. 1, a macro-to-femto cell reselection process typically precedes handover.

First, as shown in block 110 of FIG. 1, a determination may be made as to whether the mobile system is probably within range of the target femtocell. If the response is in the negative, the inquiry is repeated even as the mobile system is moving. If the response is in the affirmative, the process continues in block 120 of FIG. 1.

Next, as shown in block 120 of FIG. 1, an on-demand or unsolicited unicast message may be sent.

Then, as shown in block 130 of FIG. 1, a determination may be made as to whether the DCD and UCD have been received.

If the response is in the affirmative, the process continues to block 170 of FIG. 1 to start the handover.

If, however, the response is in the negative, the process takes a detour to block 140 of FIG. 1.

If the macrocell does not recognize the target femtocell because they are manufactured by different vendors or if the target femtocell is not able to transfer latest system information to the macrocell because they belong to networks having different operators who have not established an agreement for mutual access, the mobile system may use information in its own local femtocell database to scan the channel in block 140, find the femtocell's latest system information in block 150, and receive DCD and UCD message from the target femtocell in block 160 before starting handover.

In block 110, the determination may be made based on information stored in the mobile system. For example, the mobile system may store, such as in a cache or buffer memory, identification (ID) information of a macrocell in which the mobile system had previously performed handover to or from a target femtocell.

Consequently, whenever the mobile system returns to the same macrocell again, the mobile system will recognize the ID information of the macrocell and determine based on this information that the mobile station may be within the range of the target femtocell.

Alternatively, the macrocell may store information of a location and/or network topology in which the mobile system had previously performed handover to or from a target femtocell.

Consequently, whenever the mobile system returns to the same macrocell again, the macrocell will recognize the mobile system and determine based on this information that the mobile station may be within the range of the target femtocell.

In another example, the macrocell may have Location-Based Service (LBS) enabled. If desired, the mobile system may store the information of the location where the mobile system had previously performed handover to or from the target femtocell.

Alternatively, the mobile system may use a Global Positioning System (GPS) to determine the location.

A Worldwide Interoperability for Microwave Access (WiMAX) client may also use a co-located location-tracking device, such as the GPS, to obtain location information of the target femtocell. Consequently, whenever the mobile system returns to the same location again, the mobile system will recognize the location of the target femtocell and start scanning for the target femtocell prior to handover.

As indicated in block 120 of FIG. 1, an on-demand or unsolicited unicast message may be sent. For example, when the mobile system is expected within the coverage range of the target femtocell, the mobile system may send an on-demand unicast message, such as "MOB_FHO-REQ" to the macrocell requesting latest system identification (ID) information, such as Downlink Channel Descriptor (DCD) or Uplink Channel Descriptor (UCD), of the target femtocell prior to handover. See Table 1 in FIG. 5.

In other situations, the mobile system may have previously acquired the system identification information of the target femtocell when the user originally installed the target femtocell. Generally, the system identification information will remain unchanged. A unique identification for the target femtocell may include a 48-bit BS ID, an IP address, a host name, or a MAC address.

Upon reception of the "MOB_SCN-REQ" message, the macrocell will respond with "MOB_FHO-RSP," providing information for the mobile system to finish PHY and MAC synchronization during the cell reselection step. See Table 2 in FIG. 6.

Alternatively, without the mobile system first sending "MOB_SCN-REQ" to the macrocell, the macrocell may send the mobile system an unsolicited "MOB_FHO-RSP" message to notify the mobile system to begin preparing for handover to the target femtocell.

For example, when the mobile system is expected to enter within a coverage area of the target femtocell, the macrocell may send an unsolicited unicast message, such as MOB_FHO-RSP, to the mobile system with the latest system identification information, such as DCD or UCD, of the target femtocell prior to handover. The requested system identification information of the target femtocell will allow the mobile system to finish PHY and MAC synchronization during cell reselection.

In one situation, when the macrocell receives a unicast message from the mobile system requesting latest system information of the target femtocell, the macrocell communicates with the target femtocell through wire backbone to obtain the requested system information of the target femtocell.

In another situation, when the macrocell receives a unicast message from the mobile system requesting latest system information of the target femtocell, the macrocell communicates with the target femtocell through macrocell radio to obtain the requested system information of the target femtocell.

If the macrocell cannot obtain the latest system information of the target femtocell requested by the mobile system, the mobile system may synchronize with the target femtocell and receive on the mobile system downlink control channel while maintaining the current service connection to the macrocell.

If the macrocell does not recognize the target femtocell because they are manufactured by different vendors or if the target femtocell is not able to transfer latest system information to the macrocell because they belong to networks having different operators who have not established an agreement for mutual access, the mobile system may use information in its own local femtocell database to scan the channel in block 140, find the femtocell's latest system information in block 150, and receive DCD and UCD message from the target femtocell in block 160 before starting handover. See Table 3 in FIG. 7.

Figure 2:
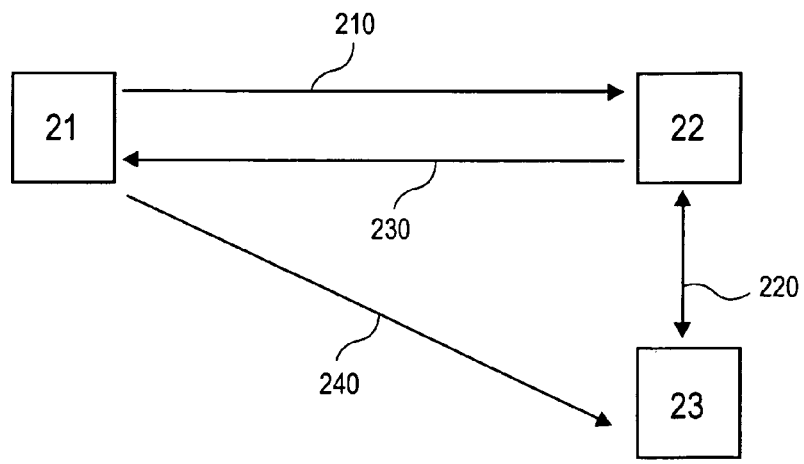
FIG. 2 shows triggering and timing for scanning and handover from macrocell to target femtocell according to an embodiment of the present invention.

With reference to FIG. 2, in accordance with some embodiments of the invention when the mobile system 23 enters a coverage area of the macrocell 21 which overlays with a coverage area of the target femtocell 22, the macrocell 21 transfers 210 the Media Access Control (MAC) context of the mobile system 23 to the target femtocell 22.

The target femtocell 22 then starts to monitor the mobile system 23 uplink transmission in the macrocell 21. This is possible when the target femtocell 22 periodically switches to a macrocell 21 client mode since the target femtocell 22 is unlikely to be fully loaded when the target femtocell 22 is expected to accept a handover.

The monitoring occurs on a Physical (PHY) layer without looking into a security layer. The target femtocell 22 listens to the macrocell 21 common downlink (DL) control channel, receives a schedule of mobile system 23 uplink (UL) transmission, and verifies whether a data burst may be successfully received via a Cyclic Redundancy Check (CRC).

Once the target femtocell 22 detects 220 that the mobile system 23 is in range, the target femtocell 22 can notify 230 the macrocell 21 and initiate scanning or handover 240. In one application, the target femtocell 22 and the macrocell 21 communicate through the wired backbone.

In another application, the target femtocell 22 and the macrocell 21 communicate through the macrocell 21 radio.

Figure 3:
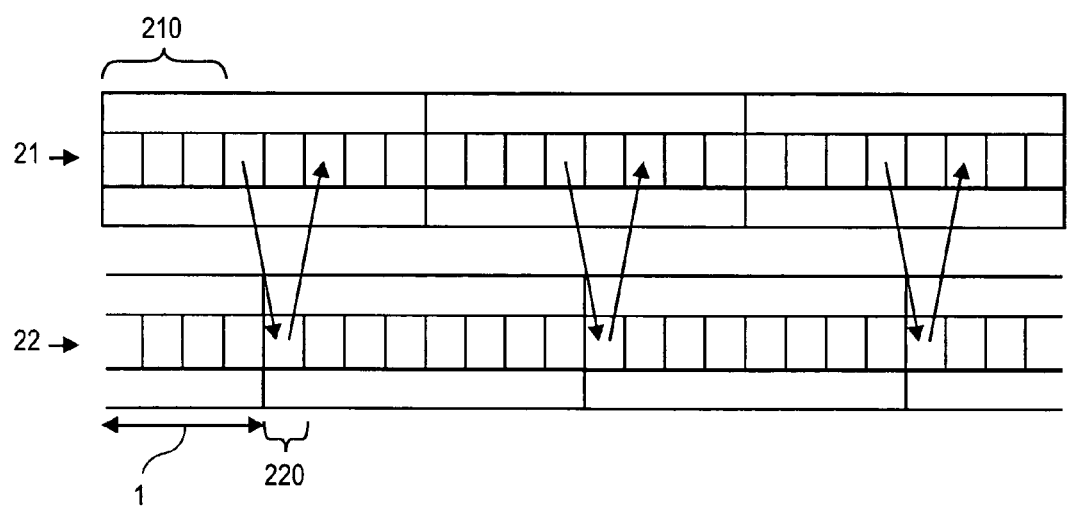
FIG. 3 shows offset of frame start to enable concurrent connection to macrocell and femtocell according to an embodiment of the present invention.

With reference to FIG. 3, system information, such as DCD and UCD, may be transmitted in certain subframes only instead of in every subframe. In such a situation, a frame start time may be offset 1 by a certain number of subframes between co-located macrocell 21 and target femtocell 22 to allow the mobile system 23 to switch between the macrocell 21 and the target femtocell 22 so as to concurrently receive control information 210 from the macrocell 21 and control information 220 from the target femtocell 22 prior to handover.

FIG. 3 shows a frame that includes 8 subframes. The mobile system 23 switches from macrocell 21 to femtocell 22 only if no relevant information is found in the macrocell DL frame, which can be known from DL control in the first DL subframe.

Figure 4:
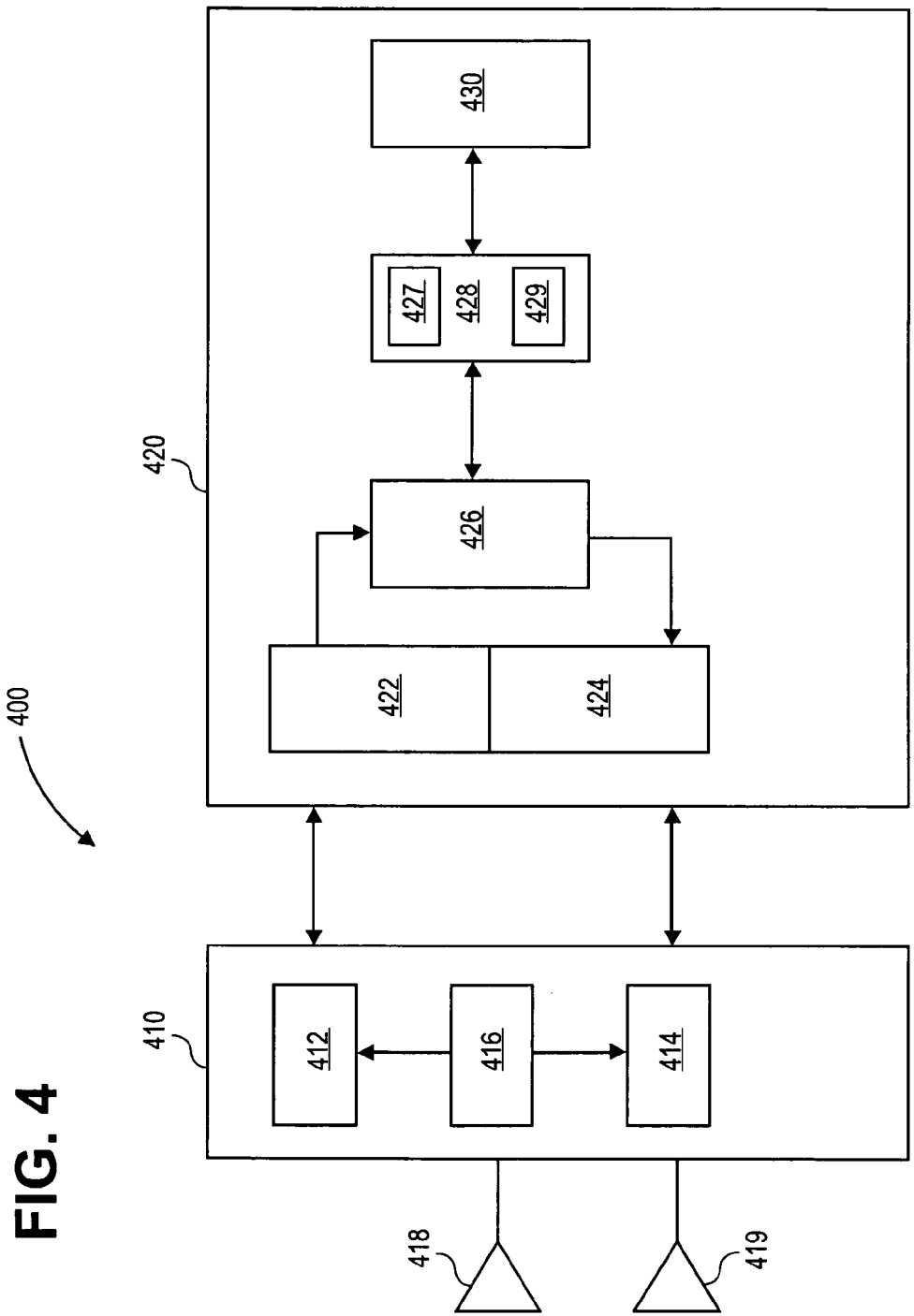
FIG. 4 shows an apparatus to perform cell reselection according to an embodiment of the present invention.

As shown in FIG. 4, the present invention further envisions an apparatus 400, such as a base station, access point, macrocell, picocell, or femtocell, functioning or operating in a network, such as a wireless network.

The apparatus 400 includes a radio frequency (RF) interface 410 and a processing portion 420. The processing portion 420 includes logic to perform the processes described previously. The logic may include hardware, firmware, and software. The hardware may include circuits.

The RF interface 410 receives and transmits signals for various over-the-air (OTA) modulation or multiplexing schemes compatible with the processes described previously. The RF interface 410 includes a receiver 412, a transmitter 414, and a frequency synthesizer 416. The RF interface 410 includes bias controls, crystal oscillator, and one or more antennae 418, 419. The RF interface 410 may include external voltage-controlled oscillators (VCOs), surface acoustic wave (SAW) filters, intermediate frequency (IF) filters, and radio frequency (RF) filters.

The processing portion 420 communicates with the RF interface 410 to receive and transmit signals. The processing portion 420 includes an analog-to-digital (ADC) converter 422 for down converting received signals, a digital-to-analog (DAC) converter 424 for up converting signals for transmission, and a baseband processor 426 for physical (PHY) link layer processing of the receive and transmit signals.

The processing portion 420 includes a processing circuit 428 for media access control (MAC)/data link layer processing. The MAC processing circuit 428 may include a scheduler 429 and a buffer memory 427. The processing portion 420 may include other interfaces 430.

The PHY baseband processor 426 and the MAC processing circuit 428 may function and operate to process bandwidth requests as described previously. The PHY baseband processor 426 performs these processes independently of the MAC processing circuit 428. If desired, the PHY baseband processor 426 and the MAC processing circuit 428 may be integrated into a single processor or circuit.

Many embodiments and numerous details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

We claim:

1. A method performed by a mobile system, the method comprising:
    storing system information from a handover previously performed by the mobile system between a macrocell and a target femtocell;
    estimating based on said system information when said mobile system enters again within a coverage area of said target femtocell;
    recognizing said coverage area based on said system information;
    scanning for said target femtocell prior to performing handover again with said target femtocell;
    synchronizing a latest system information of the target femtocell by receiving control information from the target femtocell; and
    if the macrocell cannot obtain the system information of the target femtocell requested by the mobile system, the mobile system synchronizes with the target femtocell and receives on a mobile system downlink control channel while maintaining a current service connection to the macro cell,
    otherwise, receiving control information from the macrocell while maintaining a current service connection to the macrocell and while concurrently receiving control information directly from the target femtocell.

2. The method of claim 1, wherein said system information comprises identification information of the macrocell where said mobile system had previously performed said handover between the macrocell and the target femtocell.

3. The method of claim 1, wherein said system information comprises location and/or network topology information where said mobile system had previously performed said handover between the macrocell and the target femtocell.

4. The method of claim 1, wherein the macrocell and said target femtocell collaborate to exchange said system information.

5. The method of claim 1, wherein the macrocell and said target femtocell collaborate to monitor said mobile system.

6. The method of claim 5, wherein said macrocell and said target femtocell communicate through wired backbone.

7. The method of claim 5, wherein said macrocell and said target femtocell communicate through macrocell radio.

8. An apparatus, comprising:
    buffer memory to store identification information or location information for a handover previously performed by a mobile system, the handover being performed by the mobile system between a macrocell and a target femtocell;
    logic to recognize a coverage area of the target femtocell based on said identification information or said location information; and
    a radio frequency (RF) interface capable of synchronizing a latest system information of the target femtocell by receiving control information from the target femtocell and capable of receiving downlink control information from the macrocell while maintaining a current service connection to the macrocell and while concurrently receiving control information directly from the target femtocell,
    otherwise, if the macrocell cannot obtain system information for the target femtocell requested by the mobile system, synchronizing with the target femtocell and receiving on a mobile system downlink control channel while maintaining a current service connection to the macrocell.

9. The apparatus of claim 8, further comprising: a Physical (PHY) baseband processor and a Media Access Control (MAC) processing circuit.

* * * * *